(12) United States Patent
Bladel

(10) Patent No.: US 9,858,593 B2
(45) Date of Patent: Jan. 2, 2018

(54) URL SHORTENING BASED ONLINE ADVERTISING

(75) Inventor: James Bladel, Le Claire, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 1160 days.

(21) Appl. No.: 12/757,866

(22) Filed: Apr. 9, 2010

(65) Prior Publication Data

US 2011/0251893 A1    Oct. 13, 2011

(51) Int. Cl.
*G06Q 20/00* (2012.01)
*G06F 15/16* (2006.01)
*G06F 17/00* (2006.01)
*G06Q 30/02* (2012.01)

(52) U.S. Cl.
CPC ......... *G06Q 30/0256* (2013.01); *G06Q 30/02* (2013.01)

(58) Field of Classification Search
USPC .............................................. 705/4.1–14.73
See application file for complete search history.

(56) References Cited

U.S. PATENT DOCUMENTS

| | | |
|---|---|---|
| 4,850,007 A | 7/1989 | Marino et al. |
| 5,105,184 A | 4/1992 | Pirani et al. |
| 5,305,195 A | 4/1994 | Murphy |
| 5,515,270 A | 5/1996 | Weinblatt |
| 5,600,366 A | 2/1997 | Schulman |
| 5,724,521 A | 3/1998 | Dedrick |
| 5,740,549 A | 4/1998 | Reilly et al. |
| 5,781,894 A | 7/1998 | Petrecca et al. |
| 5,793,972 A | 8/1998 | Shane |
| 5,809,242 A | 9/1998 | Shaw et al. |
| 5,838,790 A | 11/1998 | McAuliffe et al. |
| 5,857,175 A | 1/1999 | Day et al. |
| 5,870,724 A | 2/1999 | Lawlor et al. |
| 5,918,014 A | 6/1999 | Robinson |
| 5,937,037 A | 8/1999 | Kamel et al. |
| 5,948,061 A | 9/1999 | Merriman et al. |
| 6,002,393 A | 12/1999 | Hite et al. |
| 6,009,150 A | 12/1999 | Kamel |
| 6,009,409 A | 12/1999 | Adler et al. |
| 6,009,410 A | 12/1999 | LeMole et al. |
| 6,014,502 A | 1/2000 | Moraes |
| 6,026,368 A | 2/2000 | Brown et al. |
| 6,026,369 A | 2/2000 | Capek |

(Continued)

OTHER PUBLICATIONS

"10 links to shorten your links" Nicole Lee (Mar. 20, 2008), http://news.cnet.com/8301-17939_109-9898698-2.html.*

(Continued)

*Primary Examiner* — Yehdega Retta
(74) *Attorney, Agent, or Firm* — Quarles & Brady LLP

(57) ABSTRACT

Methods of the present inventions allow for URL shortening based online advertising. An exemplary method may comprise the steps of receiving a URL that resolves to a first network resource, parsing the URL into keyword(s), transmitting the keyword(s) to an online advertisement provider, receiving online advertisement(s) from the online advertisement provider, generating a second network resource (comprising the first network resource and one or more online advertisements), and generating a shortened resource locator that resolves to the second network resource.

11 Claims, 11 Drawing Sheets

(56) References Cited

U.S. PATENT DOCUMENTS

| | | | |
|---|---|---|---|
| 6,058,435 A | 5/2000 | Sassin et al. | |
| 6,064,967 A | 5/2000 | Speicher | |
| 6,067,570 A | 5/2000 | Kreynin et al. | |
| 6,085,229 A | 7/2000 | Newman et al. | |
| 6,119,098 A | 9/2000 | Guyot et al. | |
| 6,134,532 A | 10/2000 | Lazarus et al. | |
| 6,141,010 A | 10/2000 | Hoyle | |
| 6,188,398 B1 | 2/2001 | Collins-Rector et al. | |
| 6,199,106 B1 | 3/2001 | Shaw et al. | |
| 6,205,432 B1 | 3/2001 | Gabbard et al. | |
| 6,212,554 B1 | 4/2001 | Roskowski | |
| 6,216,129 B1 | 4/2001 | Eldering | |
| 6,285,987 B1 | 9/2001 | Roth et al. | |
| 6,314,451 B1 | 11/2001 | Landsman et al. | |
| 6,317,761 B1 | 11/2001 | Landsman et al. | |
| 6,351,745 B1 | 2/2002 | Itakura et al. | |
| 6,370,578 B2 | 4/2002 | Revashetti et al. | |
| 6,377,936 B1 | 4/2002 | Henrick et al. | |
| 6,379,251 B1 | 4/2002 | Auxier et al. | |
| 6,385,592 B1 | 5/2002 | Angles et al. | |
| 6,442,529 B1 | 8/2002 | Krishan et al. | |
| 6,453,347 B1 | 9/2002 | Revashetti et al. | |
| 6,457,025 B2 | 9/2002 | Judson | |
| 6,463,585 B1 | 10/2002 | Hendricks et al. | |
| 6,470,079 B1 | 10/2002 | Benson | |
| 6,484,148 B1 | 11/2002 | Boyd | |
| 6,487,538 B1 | 11/2002 | Gupta et al. | |
| 6,487,721 B1 | 11/2002 | Safadi | |
| 6,496,857 B1 | 12/2002 | Dustin et al. | |
| 6,505,169 B1 | 1/2003 | Bhagavath et al. | |
| 6,513,052 B1 | 1/2003 | Binder | |
| 6,516,338 B1 | 2/2003 | Landsman et al. | |
| 6,601,041 B1 | 7/2003 | Brown et al. | |
| 6,606,652 B1 | 8/2003 | Cohn et al. | |
| 6,622,174 B1 | 9/2003 | Ukita et al. | |
| 6,633,850 B1 | 10/2003 | Gabbard et al. | |
| 6,647,257 B2 | 11/2003 | Owensby | |
| 6,684,249 B1 | 1/2004 | Frerichs et al. | |
| 6,757,661 B1 | 6/2004 | Blaser et al. | |
| 6,757,662 B1 | 6/2004 | Greenwald et al. | |
| 6,820,277 B1 | 11/2004 | Eldering et al. | |
| 6,873,424 B2 | 3/2005 | Jakobsson et al. | |
| 6,874,018 B2 | 3/2005 | Wu | |
| 6,880,123 B1 | 4/2005 | Landsman et al. | |
| 6,892,181 B1 | 5/2005 | Megiddo et al. | |
| 6,892,354 B1 | 5/2005 | Servan-Schreiber et al. | |
| 6,898,571 B1 | 5/2005 | Val et al. | |
| 6,925,441 B1 | 8/2005 | Jones, III et al. | |
| 6,928,615 B1 | 8/2005 | Haitsuka et al. | |
| 7,047,202 B2 | 5/2006 | Jaipuria et al. | |
| 7,117,254 B2 | 10/2006 | Lunt et al. | |
| 7,281,042 B2 | 10/2007 | Hsu et al. | |
| 2001/0037205 A1* | 11/2001 | Joao | 705/1 |
| 2002/0023132 A1 | 2/2002 | Tornabene et al. | |
| 2002/0052787 A1 | 5/2002 | Matsumoto et al. | |
| 2002/0077130 A1 | 6/2002 | Owensby | |
| 2002/0126304 A1 | 9/2002 | Jakobsson et al. | |
| 2003/0050863 A1 | 3/2003 | Radwin | |
| 2003/0163372 A1* | 8/2003 | Kolsy | 705/14 |
| 2003/0191689 A1 | 10/2003 | Radwin | |
| 2004/0015397 A1 | 1/2004 | Barry et al. | |
| 2004/0019523 A1 | 1/2004 | Barry et al. | |
| 2004/0044571 A1 | 3/2004 | Bronnimann et al. | |
| 2004/0059708 A1 | 3/2004 | Dean et al. | |
| 2004/0059712 A1 | 3/2004 | Dean et al. | |
| 2004/0093327 A1 | 5/2004 | Anderson et al. | |
| 2004/0167928 A1 | 8/2004 | Anderson et al. | |
| 2004/0186778 A1* | 9/2004 | Margiloff et al. | 705/14 |
| 2004/0205200 A1 | 10/2004 | Kothari et al. | |
| 2004/0225569 A1 | 11/2004 | Bunnell | |
| 2004/0247092 A1 | 12/2004 | Timmins et al. | |
| 2004/0249709 A1 | 12/2004 | Donovan et al. | |
| 2004/0267723 A1 | 12/2004 | Bharat | |
| 2004/0267725 A1 | 12/2004 | Hank | |
| 2005/0021397 A1 | 1/2005 | Cui et al. | |
| 2005/0065806 A1 | 3/2005 | Harik | |
| 2005/0071224 A1 | 3/2005 | Fikes et al. | |
| 2005/0071325 A1 | 3/2005 | Bem | |
| 2005/0096979 A1 | 5/2005 | Koningstein | |
| 2005/0131758 A1 | 6/2005 | Desikan et al. | |
| 2005/0144069 A1 | 6/2005 | Wiseman et al. | |
| 2005/0144073 A1 | 6/2005 | Morrisroe et al. | |
| 2005/0159998 A1 | 7/2005 | Buyukkokten et al. | |
| 2005/0165904 A1 | 7/2005 | Mooney | |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0251443 A1 | 11/2005 | Chan et al. | |
| 2005/0251444 A1 | 11/2005 | Varian et al. | |
| 2005/0267872 A1* | 12/2005 | Galai et al. | 707/3 |
| 2005/0267940 A1 | 12/2005 | Galbreath et al. | |
| 2007/0016469 A1 | 1/2007 | Bae | |
| 2007/0083560 A1 | 4/2007 | Jong-il et al. | |
| 2007/0136279 A1* | 6/2007 | Zhou et al. | 707/6 |
| 2007/0162458 A1 | 7/2007 | Fasciano | |
| 2007/0214097 A1 | 9/2007 | Parsons et al. | |
| 2007/0239542 A1 | 10/2007 | Shapiro | |
| 2008/0147659 A1 | 1/2008 | Chen | |
| 2008/0040733 A1 | 2/2008 | Pousti et al. | |
| 2008/0147487 A1 | 6/2008 | Hirshberg | |
| 2008/0034040 A1 | 7/2008 | Wherry et al. | |
| 2008/0250312 A1 | 10/2008 | Curtis | |
| 2008/0288491 A1 | 11/2008 | Wu et al. | |
| 2008/0288582 A1 | 11/2008 | Pousti et al. | |
| 2009/0017804 A1* | 1/2009 | Sarukkai et al. | 455/414.3 |
| 2009/0070310 A1 | 3/2009 | Srivastava et al. | |

OTHER PUBLICATIONS

Aug. 10, 2012 office action in related U.S. Appl. No. 12/757,874.
Aug. 10, 2012 office action in related U.S. Appl. No. 12/757,878.

* cited by examiner

URL SHORTENING BASED ONLINE ADVERTISING

CROSS REFERENCE TO RELATED PATENT APPLICATIONS

This patent application is related to U.S. patent application Ser. No. 12/757,874 entitled: "TOOLS ENABLING URL SHORTENING BASED ONLINE ADVERTISING" concurrently filed herewith and also assigned to Go Daddy Operating Company, LLC.

This patent application is related to U.S. patent application Ser. No. 12/757,878 entitled: "TARGET SPECIFIC URL SHORTENING BASED ONLINE ADVERTISING" concurrently filed herewith and also assigned to Go Daddy Operating Company, LLC.

FIELD OF THE INVENTION

The present inventions generally relate to online advertising and, more particularly, systems, methods, and tools enabling Uniform Resource Locator (URL) shortening based online advertising.

SUMMARY OF THE INVENTION

An example embodiment of a URL shortening based online advertising method may comprise the steps of receiving a URL that resolves to a first network resource, parsing the URL into keyword(s), transmitting keyword(s) to an online advertisement provider, receiving online advertisement(s) from the online advertisement provider, generating a second network resource (comprising the first network resource and one or more online advertisements), and generating a shortened resource locator that resolves to the second network resource.

An example embodiment of a system enabling URL shortening based online advertising may comprise a website hosted on a server computer and having a field configured to receive a URL that resolves to a first network resource. The system may further comprise software modules running on at least one server computer communicatively coupled to the website and may include: a keyword extraction module configured to parse the URL into keyword(s) and transmit keyword(s) to an online advertisement generation module configured to generate online advertisement(s) relevant to the keyword(s) and transmit them to a network resource generation module configured to generate a second network resource (comprising the first network resource and one or more online advertisements), and a shortened resource locator generation module configured to generate a shortened resource locator that resolves to the second network resource.

The above features and advantages of the present inventions will be better understood from the following detailed description taken in conjunction with the accompanying drawings.

DETAILED DESCRIPTION

Figure 1:
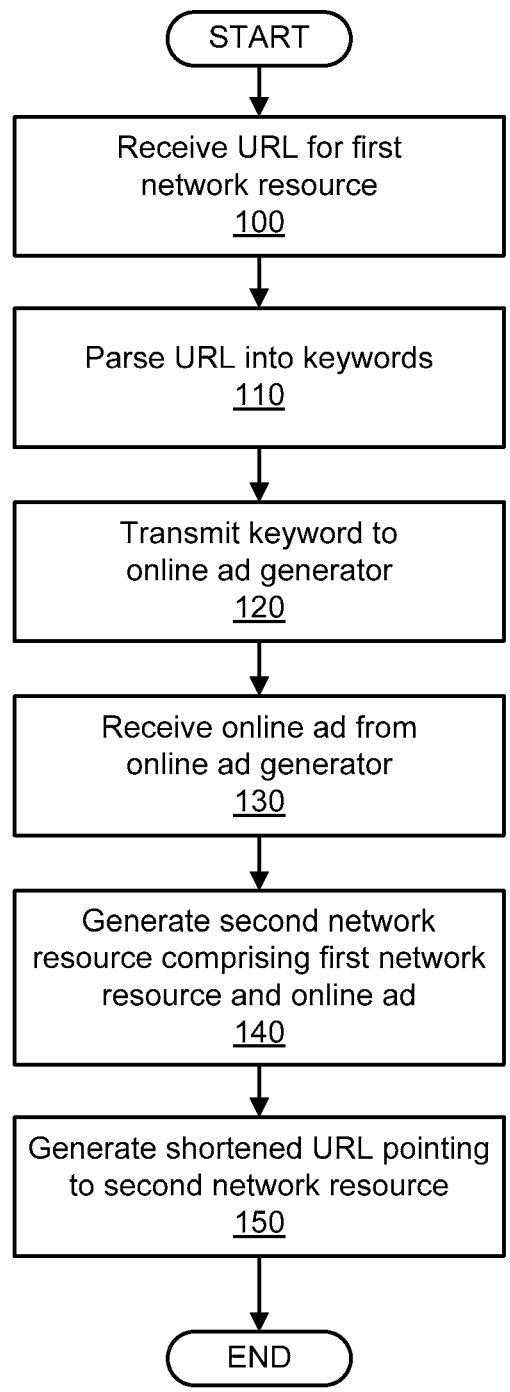
FIG. 1 is a flow diagram illustrating a possible embodiment of a URL shortening based online advertising method.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be increasingly valuable. People increasingly use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Social websites have recently become popular. A social website may comprise any website that focuses on providing online social networks for communities of people who may share interests and activities, wish to communicate with each other efficiently, and may be interested in exploring the interests and activities of others, and which may use software applications to effectuate such communication. Social websites may provide numerous ways for users to interact, such as micro-blogging, blogging, chat, forums, instant messaging, email, video, voice chat, file sharing, discussion groups, etc. Social websites may provide directories of categories or users (such as former classmates), means to connect and communicate with other users, and/or recommendation systems linked to trust. Popular social websites now combine many of these, with TWITTER, MYSPACE, FACEBOOK, YOUTUBE, LINKEDIN, and FLICKR being but a few examples.

Such websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

An example of a URL with a HTTP request and domain name is: http://www.companyname.com. In this example, the "http" identifies the URL as a HTTP request and "companyname.com" as the domain name. Oftentimes, however, a URL is substantially longer that this example. If, for example, an image file from a subdirectory on as server is sought by a browser, the corresponding URL may be something similar to: http://www.companyname.com/folder1/sub-folder2/sub-sub-folder3/photoID=123456/image.jpg, or perhaps an even longer URL. It is not uncommon for URLs to exceed one hundred characters.

Long URLs pose may problems to Internet users, particularly to those sharing URLs over social networks or via mobile devices (e.g., Smartphones). For example, long URLs may be aesthetically unpleasant and difficult to remember. Copying a URL that is hundreds of characters long may make result in URL transcription errors. Also, many social websites (e.g., TWITTER) and/or instant messaging applications impose character limitations on messages. Social website users may therefore be unable to post a link to a webpage having a too-long URL. A technique known as URL shortening resolves some such problems. URL shortening is a technique making a webpage available under a shortened resource locator (in addition to the original URL). Using the above example, the image file on the webpage http://www.companyname.com/folder1/sub-folder2/sub-sub-folder3/photoID=123456/image.jpg may be shortened to, for example, http://XYZ123.com.

Applicant has determined that presently-existing systems and methods for monetizing social websites do not provide optimal means for presenting social website users with content-relevant, online advertisements. Also, online advertisers currently do not have adequate means for tracking online advertisement performance or generating conversion data for links shared over social networks or URL shortening services. For these reasons, there is a need for the systems, methods, and tools enabling URL shortening based online advertising (and related functionality) as described herein.

URL Shortening Based Online Advertising

FIG. 1 illustrates an example embodiment of a URL shortening based online advertising method that may comprise the steps of receiving a URL resolving to a first network resource (Step 100), parsing the URL into at least one keyword (Step 110), transmitting at least one keyword to an online advertisement provider (Step 120), receiving at least one online advertisement from the online advertisement provider (130), generating a second network resource comprising the first network resource and at least one online advertisement (Step 140), and generating a shortened resource locator resolving to the second network resource (Step 150).

As a non-limiting example, the steps of the method illustrated in FIG. 1 (and all methods described herein) may be performed by any central processing unit (CPU) in any computing system, such as a microprocessor running on a server computer, and executing instructions stored (perhaps as scripts and/or software) in computer-readable media accessible to the CPU, such as a hard disk drive on a server computer, which may be communicatively coupled to a network (e.g., the Internet). Such software and/or scripts may comprise server-side software, client-side software, and/or browser-implemented software (e.g., a browser plugin).

A server computer, perhaps via scripts and/or software running on it, may receive a URL resolving to a first network resource (Step 100). As described in detail above, the URL may comprise any name or address pointing to any computer, directory, file, webpage, website, database, or other resource accessible via a network such as the Internet. As a non-limiting example, the URL may comprise a Uniform Resource Identifier (URI), a Uniform Resource Name (URN), or any other set of characters used to identify a resource on the Internet.

Figure 2:
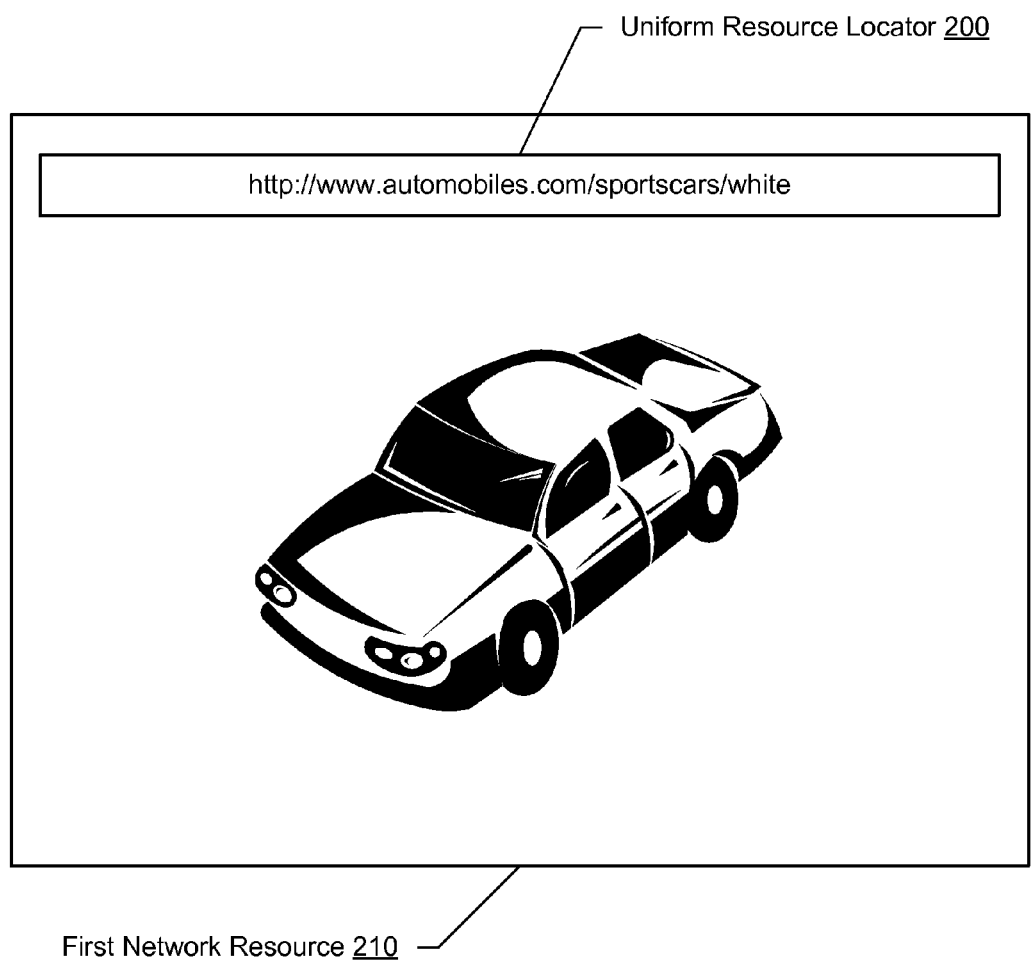
FIG. 2 illustrates an example first network resource resolving from a URL.

FIG. 2 illustrates a first network resource 210 that may resolve from a URL 200 when entered in a browser. As a non-limiting example, the first network resource 210 may comprise any physical, abstract, or informational resource accessible via a network such as the Internet including, but not limited to, a computer, directory, file, webpage, website, or database. FIG. 2. Illustrates an example embodiment wherein the first network resource 210 comprises a webpage having an image of an automobile that resolves from the example URL 200: http://www.automobiles.com/sportscars/white.

The URL 200 may be received (Step 100), perhaps by a server computer, by any method of receiving a URL 200 (or other collection of data) known in the art or developed in the future including, but not limited to, via a data field on a website in which a user may type a URL 200. The URL 200 may be received by any communication transmitting the URL 200, perhaps via an electronic communication received at a server including, but not limited to, electronic requests such as a Hyper Text Transfer Protocol (HTTP) or File Transfer Protocol (FTP) transmission, an email message, and/or a Short Message Service (SMS) message (i.e., text message). As a specific non-limiting example, a URL 200 may be received via an HTTP request initiated by a website user who wishes to shorten a URL 200 and, accordingly, enters the URL 200 into a data field on a website and clicks a button labeled "shorten URL," or something similar, causing the URL to be transmitted and received at a server.

The URL 200 may then be parsed into at least one keyword (Step 110). Parsing is the process of analyzing a sequence of characters or tokens to determine its grammatical structure with respect to a given formal grammar. Parsing transforms input text into a data structure, such as the keywords used here. As a non-limiting example, if a server receives the example URL 200: http://www.automobiles.com/sportscars/white, software and/or scripts running on the server may parse the URL 200 into, among others, the keywords "automobile," "sports," "sportscars," "cars," and/or "white." The URL may be parsed using any parsing methodology known in the art including, but not limited to, top-down parsing and/or bottom-up parsing. The parsing process also may include glyph or character substitution (i.e., identifying typographically improper characters and substituting characters that result in potentially-meaningful keywords). For example, the parsing process may replace the "0" in the URL 200: http://www.aut0mobiles.com/sportscars/white with an "o," resulting in more effective keyword parsing because "automobiles" is more likely a valid keyword than "aut0mobiles."

In one possible embodiment, the first network resource 210 may be considered within the definition of the "URL 200." Thus, in one non-limiting example implementation of Step 110, the first network resource 210 resolving from the URL 200 may itself be parsed into at least one keyword. For example, where the first network resource 210 comprises a website, software and/or scripts running on at least one server computer may extract keywords from the HTML file(s) from which the website is generated, or perhaps scan a webpage on the website to identify and extract keywords.

At least one of the keywords may then be transmitted to an online advertisement provider (Step 120), which may comprise any individual or entity providing contextual online advertisements for inclusion on websites (e.g., a contextual advertising service). The online advertisement provider (e.g., GOOGLE) may maintain a database of advertisers who specify keywords that relate to their advertisements. Advertisers pay the online advertisement provider for inclusion in the database. A website provider may partner with the online advertisement provider to provide advertising content on its website. When Internet users access the website and click on an advertisement, the online advertisement provider may pay the website provider a fee. This advertising model is known as "pay per click." Examples of such programs include GODADDY.COM CASHPARKING, GOOGLE ADSENSE and ADWORDS, YAHOO! SEARCH MARKETING, and MICROSOFT ADCENTER. Usually, the online advertisement provider pays the website provider based on how many links have been visited (e.g., pay per click) and/or on how beneficial those visits have been.

Keywords may be transmitted to an online advertisement provider (Step 120), perhaps via a network such as the Internet, according to any data transmission protocol known in the art or developed in the future including, but not limited to file transfer protocol (FTP). Viable data transfer methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to: (1) those used with TCP/IP (e.g., FTAM, FTP, HTTP, RCP, SFTP, SCP, or FASTCopy); (2) those used with UDP (e.g., TFTP, FSP, UFTP, or MFTP); (3) those used with direct modem connections; (4) HTTP streaming; (5) Tubular Data Stream Protocol (TDSP); (6) Stream Control Transmission Protocol (SCTP); and/or (7) Real Time Streaming Protocol (RTSP).

At least one online advertisement may then be received from the online advertisement provider (Step 130), perhaps via an electronic communication received at a server including, but not limited to, electronic requests such as a Hyper Text Transfer Protocol (HTTP) of File Transfer Protocol (FTP) transmission, an email message, and/or a Short Message Service (SMS) message (i.e., text message). The online advertisement may comprise any form of online advertising including, but not limited to, text, graphics, video, and/or audio data. The online advertisement also could comprise a hyperlink to another website, another website, and/or both. Among other types, the online advertisement may be a pop-up, pop-under, banner, rich media (i.e., interactive), contextual, targeted, and/or focused online advertisement. As another non-limiting example, the online advertisement may comprise a contextual advertisement relevant to a keyword transmitted to the online advertisement provider in Step 120. Continuing with the above examples, if the keywords "automobile," "sports," "sportscars," "cars," and/or "white" are transmitted to the online advertisement provider, online advertisements relating to these topics may be returned.

A second network resource (perhaps comprising the first network resource and at least one online advertisement) may then be generated (Step 140). As with the first network resource 210. The second network resource may comprise any physical, abstract, or informational resource accessible via a network such as the Internet including, but not limited to, a computer, directory, file, webpage, website, or database. Where the second network resource comprises a webpage accessible through a browser and displayable on a computer screen, it may be generated by any method of generating a webpage known in the art or developed in the future including, but not limited to, software and/or scripts running on a server computer generating an HTML or XML file that renders when consumed by a browser.

Figure 3:
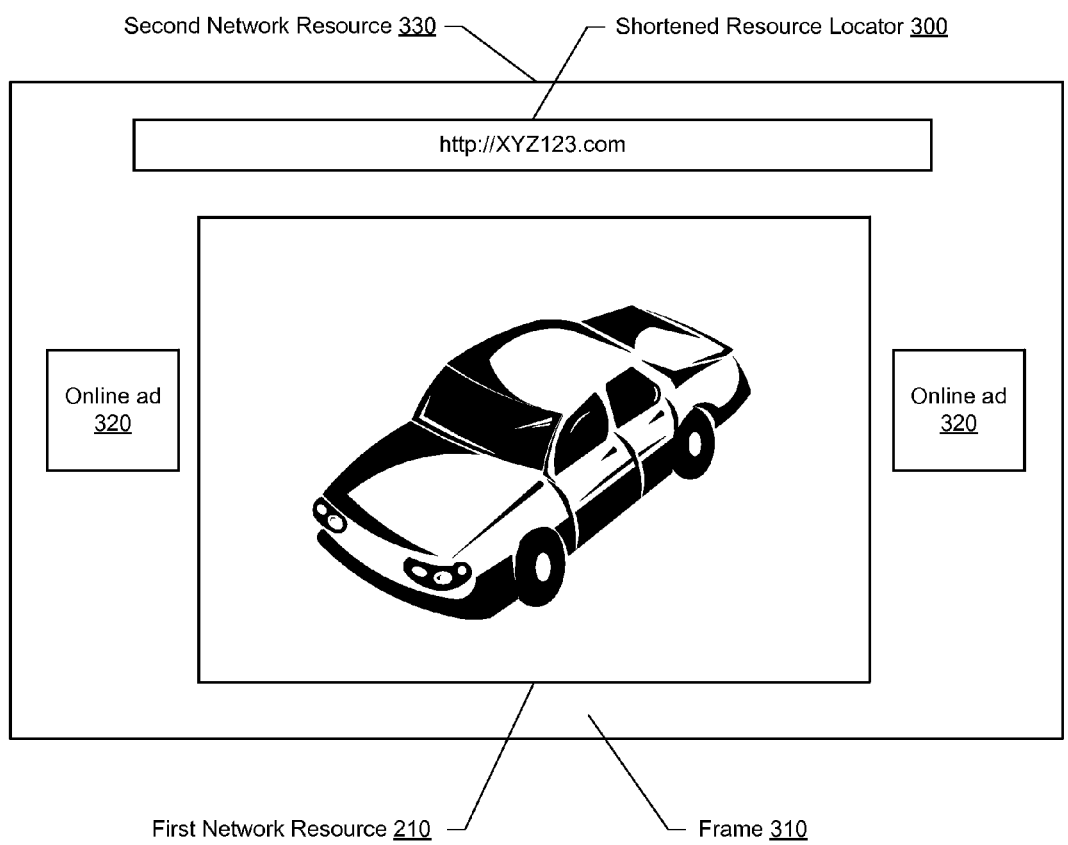
FIG. 3 illustrates an example second network resource resolving from a shortened resource locator.
Figure 4:
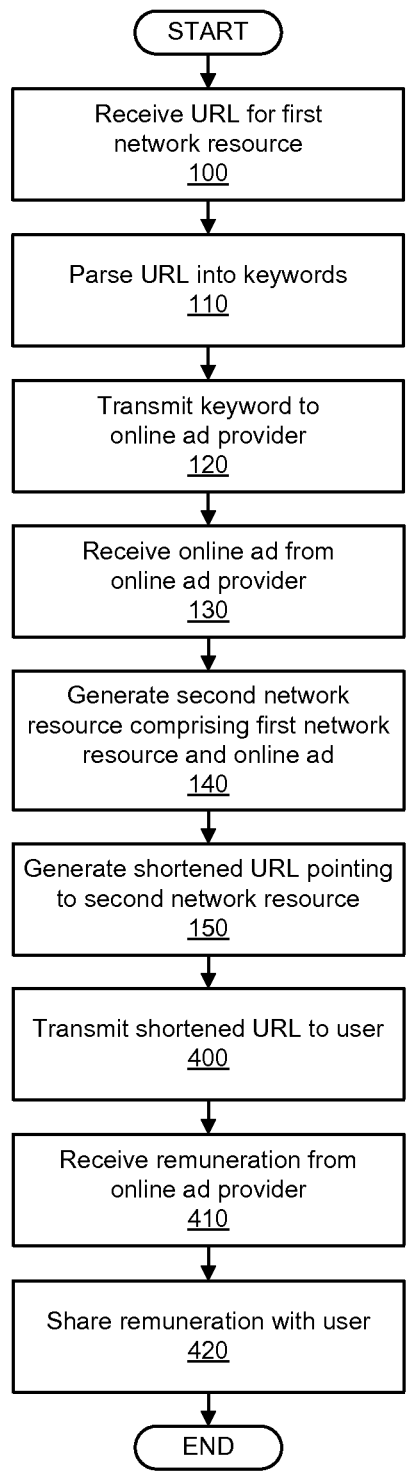
FIG. 4 is a flow diagram illustrating a possible embodiment of a URL shortening based online advertising method.

FIG. 3 illustrates a second network resource 330 (e.g., a webpage) that comprises a frame 310 prepended over the first network resource 320 (e.g., a webpage having an image of an automobile), wherein at least one online advertisement 320 is displayed in the frame. In this example embodiment, the online advertisement(s) 320 may relate to the keywords "automobile," "sports," "sportscars," "cars," and/or "white" transmitted to the online advertisement provider in Step 120. In an alternate embodiment, at least one online advertisement 320 may comprise a text-highlighted advertisement on the second network resource 330 (e.g., webpage). Such text-highlighted advertisements may comprise a form of contextual advertising where specific keywords within the text of a network resource (e.g., webpage) are matched with relevant online advertisements 320. Such text-highlighted advertising may place hyperlinks directly into the text of the network resource (e.g., webpage).

A shortened resource locator 300 resolving to the second network resource 330 then may be generated (Step 150). The shortened resource locator 300 may comprise any network name or address (e.g., a URI, URN, URL, or any other set of characters used to identify a resource on the Internet) pointing to the second network resource 330. As a non-limiting example, the shortened resource locator 300 may comprise a URL that is shorter than the URL 200 received in step 100. It may be pointed to the second network resource 330 by storing the second network resource 330 on a network storage device (e.g., hosting a website) and mapping the shortened resource locator 300 to the actual URL for the second network resource 330 (where the prepended frame approach of FIG. 3 is taken) or the URL 200 for the first network resource 210 (where a text-highlighted advertisement approach is taken).

Any method and/or technology known in the art or developed in the future for mapping one URL to another URL including, but not limited to URL forwarding, redirecting, masking and/or any combination thereof may be used. URL redirection (also called URL forwarding) is a technique for making a web page available under many URLs. This may be accomplished by manual redirection, using HTTP 3xx status codes, server-side redirection scripting, .htaccess files, meta refresh redirection, JavaScript redirects, frame redirects, and/or redirect loops. Alternatively, masking may be accomplished by using an HTML inline frame or frameset so a frame embedded in the webpage points to another webpage. Aliases also may be implemented to have the web server serve the same page for two different URLs.

Figure 5:
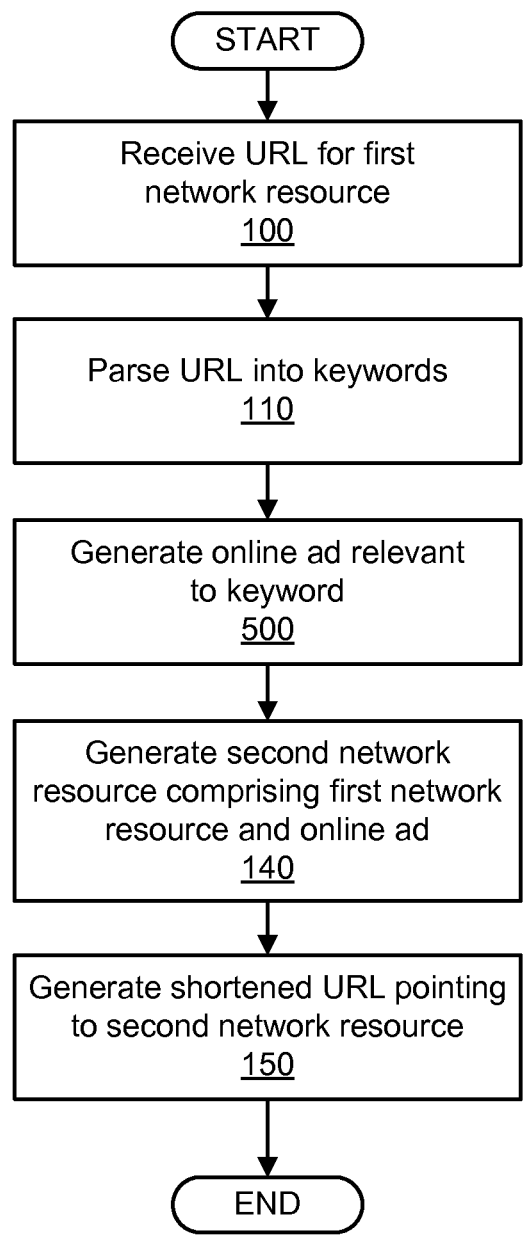
FIG. 5 is a flow diagram illustrating a possible embodiment of a URL shortening based online advertising method.

FIG. 5 builds upon the method illustrated in FIG. 1, wherein a user having access to the network submits the URL received in Step 100. Steps 110 though 140 may be accomplished as described above. In this example embodiment, however, the shortened resource locator 300 generated in Step 150 may further comprise a unique user identifier identifying the user. The user identifier may enable the tracking of online advertisements 320 resulting from URLs submitted by the user. As explained in further detail below, such tracking may be necessary to allow for advertising revenue sharing with the user. As a non-limiting example, a user identifier such as "user123" may be concatenated to the shortened resource locator 300: "http://XYZ123.com" to generate a user-trackable shortened resource locator 300 such as: "http://XYZ123/user123.com."

The shortened resource locator 300 then may be transmitted to the user by any of the data transmission and/or communication methods described in detail above. Should the user publish the shortened resource locator 300 (perhaps on a social website such as TWITTER) and another Internet user clicks on it (thereby entering the shortened resource locator 300 into a browser) the client on which the browser is running may render the second network resource 330 along with online advertisements 320. Should Internet users subsequently click the online advertisements 320, remuneration may subsequently be received from the online advertisement provider (Step 410) per the online advertisement provider's terms of service or other contractual obligation. Remuneration may comprise any compensation including, but not limited to, financial compensation. Such financial compensation may be paid on a cost-per-click (e.g., a price paid for each click on the online advertisement 320), cost-per-impression (e.g., a price paid for each appearance of the online advertisement 320), cost-per-acquisition (e.g., a price paid for each sale resulting from online advertisement 320), flat fee (e.g., a one-time payment), or recurring fee (e.g., monthly or annual) basis. Such financial remuneration subsequently may be shared with the user (Step 420) in accordance with predetermined terms.

Figure 6:
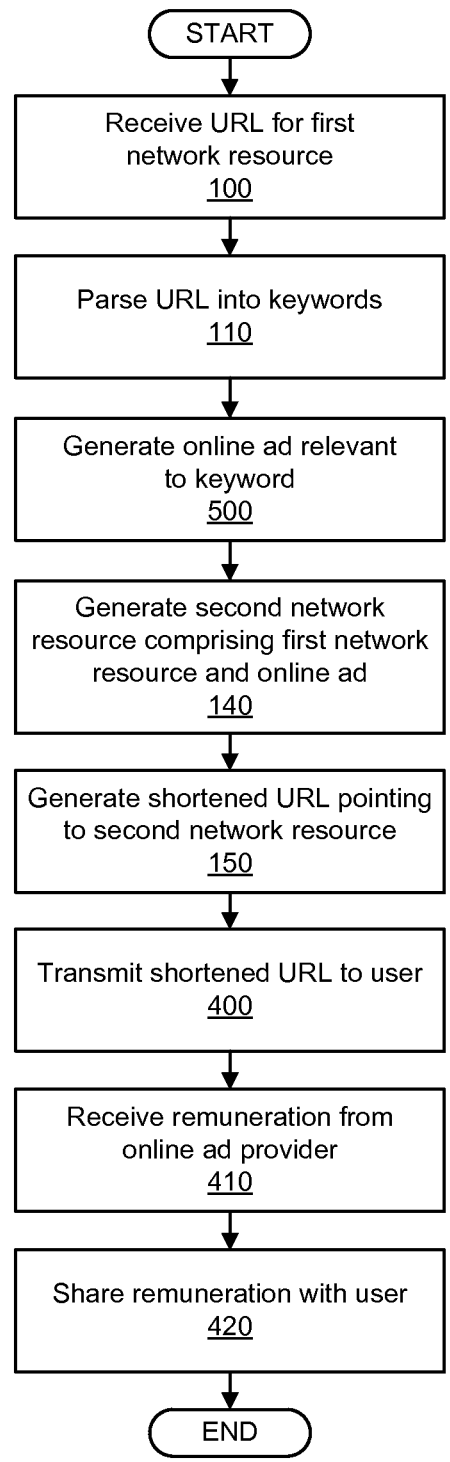
FIG. 6 is a flow diagram illustrating a possible embodiment of a URL shortening based online advertising method.

FIG. 6 illustrates an alternate embodiment of a URL shortening based online advertising method that enables the practicing entity to perform both the URL shortening function and the online advertisement 320 generating function (as opposed to the above described methods wherein a third-party online advertisement provider is used). The illustrated method may comprise the steps of receiving a URL 200 resolving to a first network resource 210 (Step 100), parsing the URL 200 into at least one keyword (Step 110), generating at least one online advertisement 320 relevant to the keyword (Step 500), generating a second network resource 310 comprising the first network resource 210 and at least one online advertisement 320 (Step 140), generating a shortened resource locator 300 resolving to the second network resource 330 (Step 150), transmitting the shortened resource locator 300 to the user (Step 400), receiving remuneration from the online advertisement provider (Step 410), and sharing the remuneration with the user (Step 420).

Steps 100, 110, 140, 150, 400, 410, and 420 may be accomplished as described in detail above. An online advertisement 320 relevant to the keyword may be generated (Step 500) by any means of generating and/or publishing an online advertisement 320 known in the art or developed in the future including, but not limited to, computer-implemented software for posting data on a webpage or website. The online advertisement may comprise any form of online advertising including, but not limited to, text, graphics, video, and/or audio data. The online advertisement 320 also could comprise a hyperlink to another website or webpage. Among other types, the online advertisement may be a pop-up, pop-under, banner, rich media (i.e., interactive), contextual, targeted, and/or focused advertisement.

Tools Enabling URL Shortening Based Online Advertising

Figure 7:
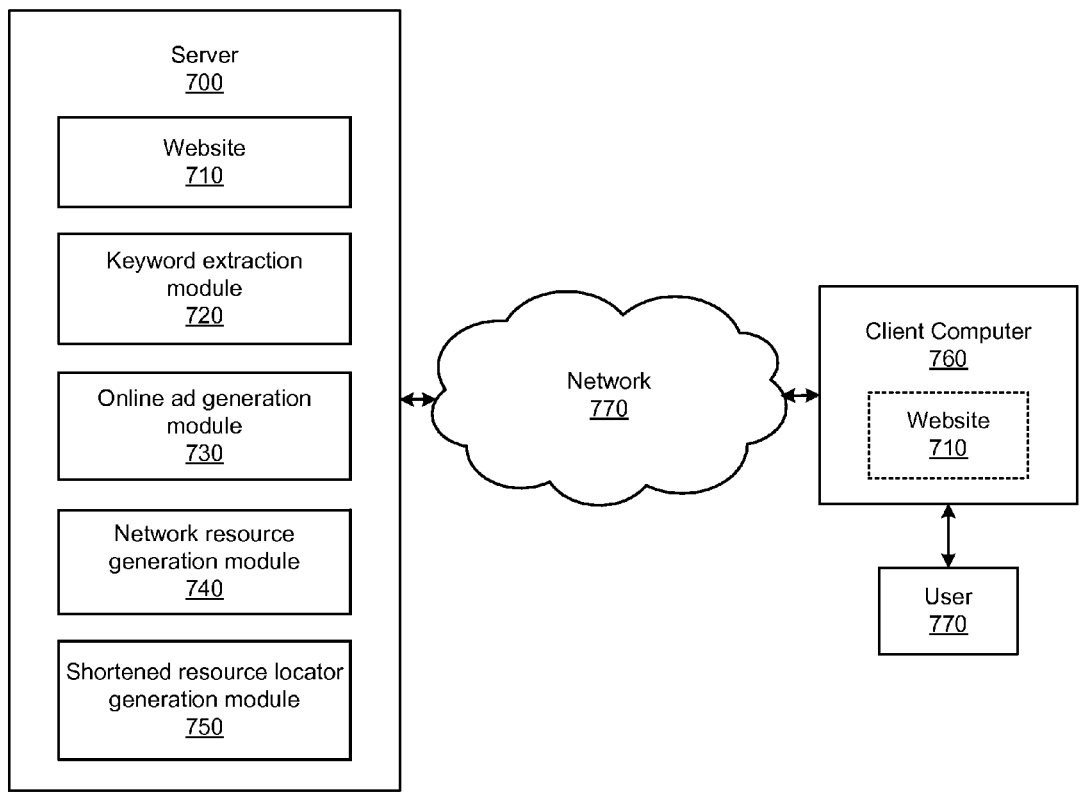
FIG. 7 illustrates a possible embodiment of a system enabling URL shortening based online advertising.

FIG. 7 illustrates a possible embodiment of a system enabling URL shortening based online advertising. The illustrated embodiment may comprise a website 710 hosted on at least one server computer 700 communicatively coupled to a network 770 and comprising a field configured to receive a URL 200 resolving to a first network resource 210, a keyword extraction module 720 configured to parse the URL 200 into at least one keyword and transmit at least one keyword to an online advertisement generation module 730 configured to generate at least one online advertisement 320 relevant to at least one keyword and transmit at least one online advertisement 320 to a network resource generation module 740 configured to generate a second network resource 330 (that may comprise the first network resource 210 and at least one online advertisement 320), and a shortened resource locator generation module 750 configured to generate a shortened resource locator 300 resolving to the second network resource 330.

The example embodiments herein place no limitation on network 770 configuration or connectivity. Thus, as non-limiting examples, the network 770 could comprise the Internet, the public switched telephone network, the global Telex network, computer networks (e.g., an intranet, an extranet, a local-area network, or a wide-area network), wired networks, wireless networks, or any combination thereof.

Servers 700 may be communicatively coupled to the network 770 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

As non-limiting examples, the servers 700 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof). Clients 760 that may be used to connect to the network 770 to use the illustrated embodiments may include a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Each module described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on at least server computer 700 containing instructions (perhaps stored in computer-readable media accessible by the server computer's computer processor) that, when executed by the computer processor, cause the server computer to extract a keyword from a URL (e.g., Element 720 performing Steps 110 and 120), generate an online advertisement 320 that may be based on the keyword (e.g., Element 730 performing Step 500), generate a second network resource (e.g., Element 740 performing Step 140), and generate a shortened resource locator 300 (e.g., Element 750 performing Step 150). FIG. 7 further illustrates that the website 710 may be accessed by a user 770, perhaps via a browser running on a client computer 760.

Figure 8:
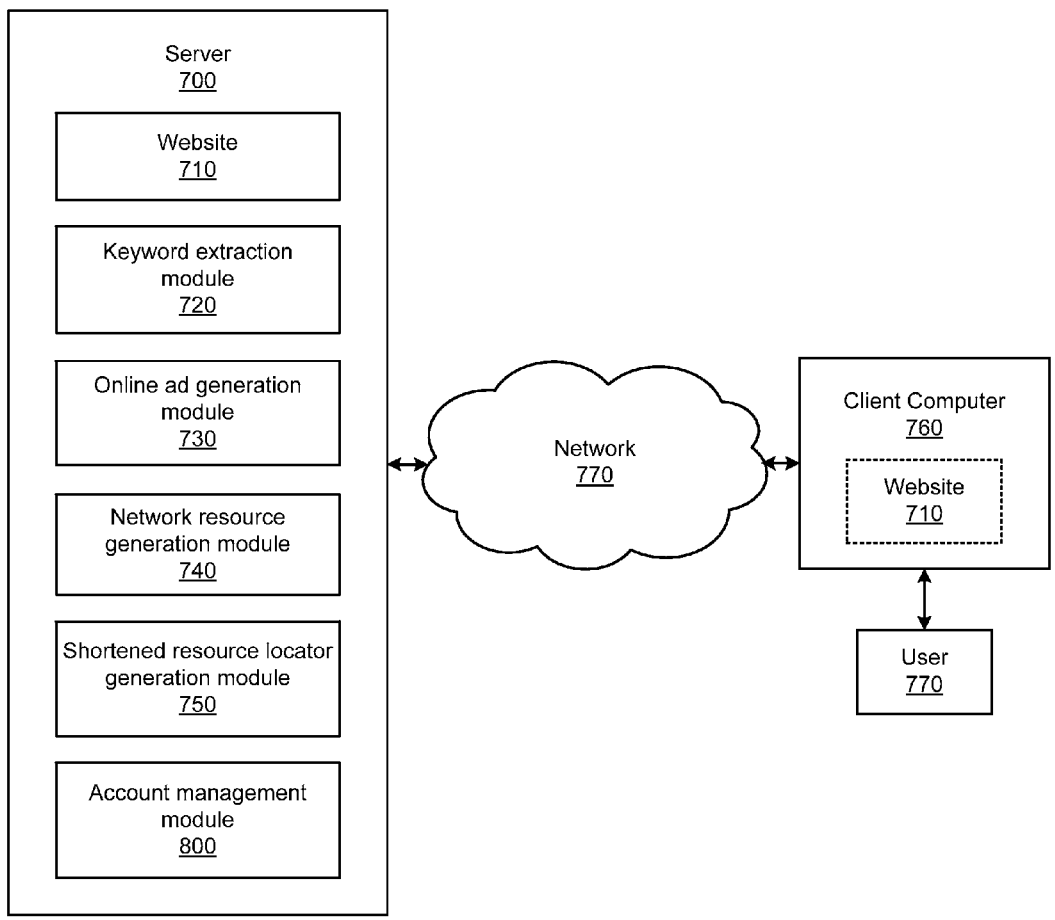
FIG. 8 illustrates a possible embodiment of a system enabling URL shortening based online advertising.

FIG. 8 illustrates an alternate system embodiment that builds upon the system illustrated in FIG. 7. In this example embodiment, an account management module 800 may run on a server computer 700. The account management module 800 may be configured to provide account, user, and payment management services. As a non-limiting example, the account management module 800 may be configured to issue users 770 with an account, provide login credentials (e.g., username and password combinations), and generate a user identifier unique to each user. As described in detail above, the user identifier may enable the tracking of online advertisements 320 resulting from URLs submitted by the user. Such account data may be relationally stored by the account management module 800 for tracking purposes.

The account management module 800 may further be configured to interface with the online advertisement generation module 730 by collecting remuneration for online advertisement 320 click-throughs and/or any other payment arrangement agreed to with the online advertisement generation module 730. Additionally, account management module 800 may be configured to track the traffic generated by online advertisements 320 generated from a particular user's 770 submitted URL 200 and share such financial remuneration with the user 770 (Step 420) in accordance with predetermined terms such as those described in detail above.

Figure 9:
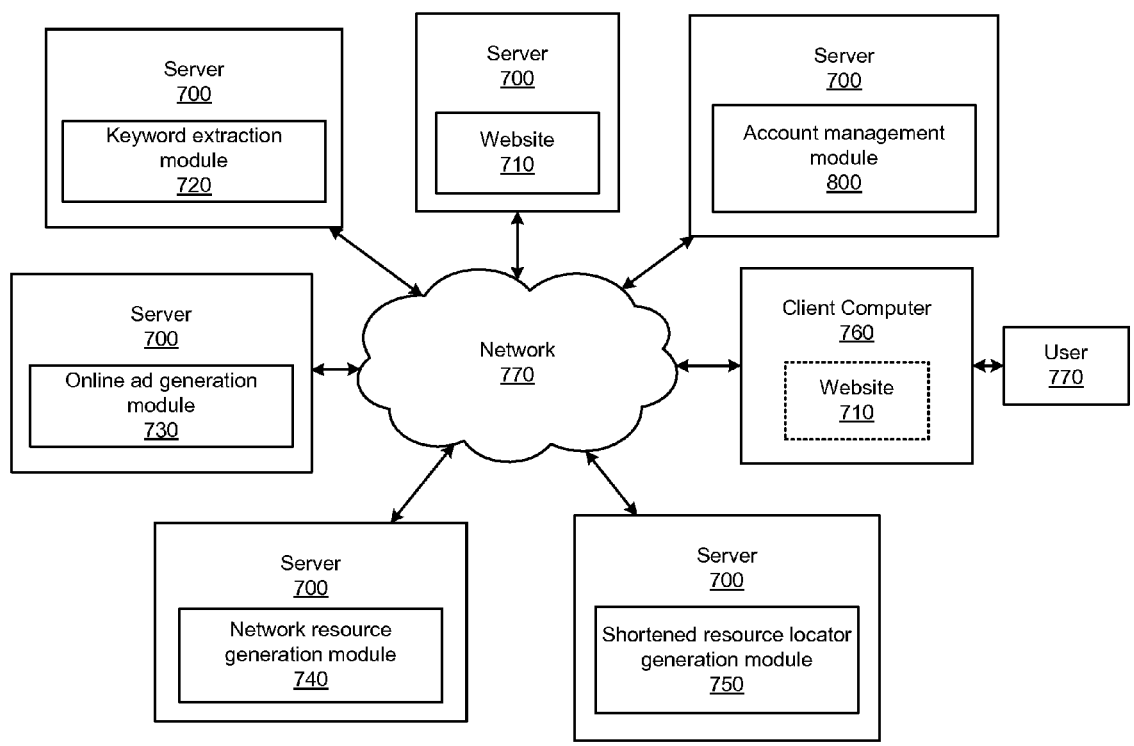
FIG. 9 illustrates a possible embodiment of a system enabling URL shortening based online advertising.

FIG. 9 illustrates a highly-distributed system embodiment, wherein the website 710, keyword extraction module 720, online advertisement generation module 730, network resource generation module 740, shortened resource locator generation module 750, and account management module 800 all run on separate servers 700. In alternate embodiments, each may run on a single server 700, a grid computing solution, a cloud computing solution, and/or any combination thereof. Grid computing may refer to a network of servers interconnected in a grid and running in parallel to maximize computing power. Cloud computing may refer to a model of networked data storage and/or computing functionality where data and software may be stored and/or run on multiple virtual servers, generally hosted by third parties, rather than being hosted on dedicated servers.

Target Specific URL Shortening Based Online Advertising

Figure 10:
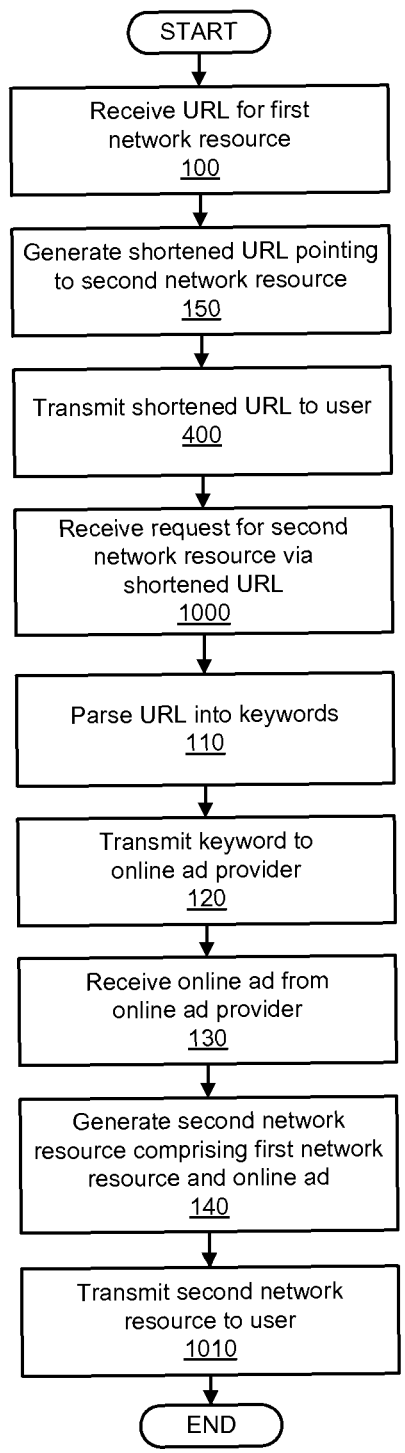
FIG. 10 is a flow diagram illustrating a possible embodiment of a URL shortening based online advertising method.

FIG. 10 illustrates an example embodiment of a URL shortening based online advertising method that may generate and provide online advertisements 320 each time an Internet user clicks on a shortened resource locator 300. This example embodiment may provide online advertisements 320 that remain relevant to the first network resource 210 should its content (or URL 200) change over time.

The illustrated method may comprise the steps of receiving a URL 200 that may resolve to a first network resource 210 (Step 100), generating a shortened resource locator 300 that may be associated (perhaps by being stored in association in a file, database, or other data storage means) with the URL 200 (Step 150), transmitting the shortened resource locator 300 to a first user (Step 400), receiving from a second user a request for a second network resource 330 that may resolve from the shortened resource locator 300 (Step 1000), parsing the URL 200 (or the first network resource 210) into at least one keyword (Step 110), transmitting at least one keyword to an online advertisement provider (Step 120), receiving at least one online advertisement 320 from the online advertisement provider (Step 130), generating the second network resource 330 (perhaps comprising the first network resource 210 and at least one online advertisement 320) (Step 140), and transmitting, responsive to Step 1000, said second network resource 330 to the second user (Step 1010).

Steps 100, 150, 400, 110, 120, 130, and 140 may be accomplished as described in detail above. Step 1000 (receiving a request for a second network resource 330 that may resolve from the shortened resource locator 300) may be accomplished by any method known in the art or developed in the future of receiving a network resource request. As a non-limiting example, this step may be accomplished by receiving (perhaps at a server computer coupled to the Internet) an HTTP request generated when an Internet user (the second user) clicked on a shortened resource locator 300 that had been posted to a social website. A response, perhaps comprising the second network resource 330 may be transmitted (perhaps by the receiving server computer) in response (Step 1010).

Figure 11:
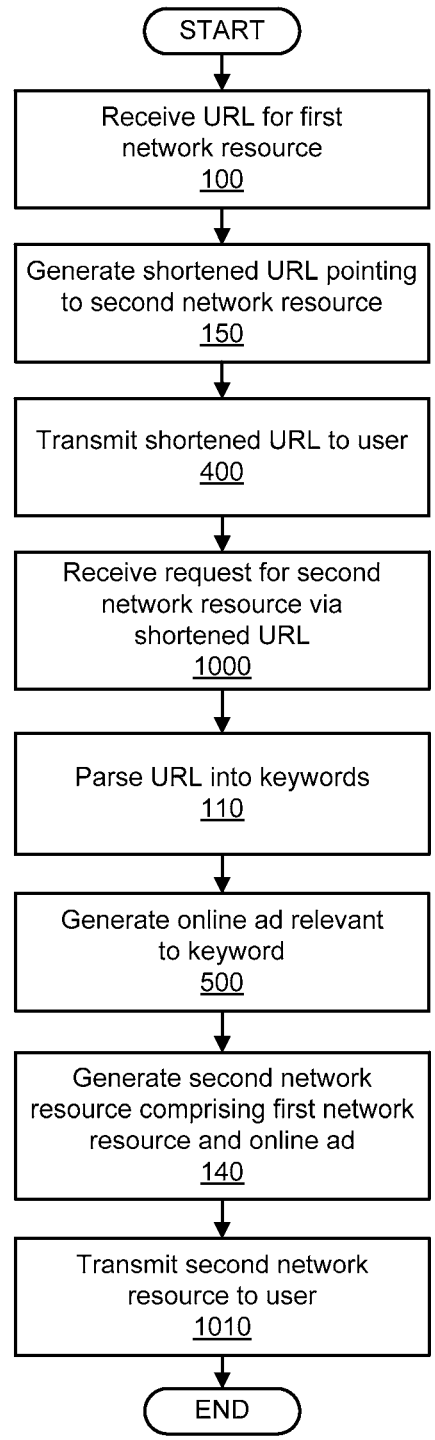
FIG. 11 is a flow diagram illustrating a possible embodiment of a URL shortening based online advertising method.

FIG. 11 illustrates an alternate embodiment of a URL shortening based online advertising method illustrated in FIG. 10 that enables the practicing entity to perform both the URL shortening function and the online advertisement 320 generating function (Step 320) (as opposed to the above described methods wherein a third-party online advertisement provider is used).

An Example Use of Methods and Tools Enabling URL Shortening Based Online Advertising As a non-limiting example, an Internet user 770 wishing to share a URL with other users, perhaps via a social networking website such as TWITTER, may use the embodiments described herein as follows. If, for example, the user 770 finds the webpage having the URL 200: http://www.automobiles.com/sportscars/white to be of interest, he may wish to share a link to the webpage, perhaps with additional commentary, via his TWITTER account. Via the browser on his client computer 760, he may navigate to a URL shortening website 710 and cut and paste the URL 200 into a data field on the website 710. He then may click a button, perhaps labeled: "provide shortened URL," which may cause the website to transmit an HTTP request to a keyword extraction module 720 running on a server computer 700 communicatively coupled the URL shortening website 710 via Internet.

The URL then may be received (Step 100) by the keyword extraction module 720, which then may parse the URL 200 into keywords (Step 110) and transmit the keywords (Step 120) to a third-party online advertisement generation module 730 (e.g., GOOGLE ADWORDS and ADSENSE). The online advertisement generation module 730 then may search its database of online advertisements 320 for, and responsively transmit, advertisements 320 relevant to the received keywords to a network resource generation module 740.

After the advertisements 320 are received (Step 130), the network resource generation module 740 then may generate a second network resource 330, perhaps comprising an HTML file that a browser may render into a new webpage comprising the first network resource 210 (e.g., the webpage of interest to the user 770) surrounded by a frame 310, which may display a variety of online advertisements 320 that relate to the webpage displayed in the frame 310 (e.g., FIG. 3). The second network resource 330 may be hosted on any server computer 700.

A shortened resource locator generation module 750 then may generate a shortened resource locator 300 (e.g., http://XYZ123.com) that resolves to the second network resource 330 (e.g., the new webpage). For fee-sharing purpose, the shortened resource locator 300 may include a unique and trackable user identification code (e.g., http://XYZ123/user123.com) that will enable the tracking of URLs submitted by users. The shortened resource locator generation module 750 then may transmit the user-trackable shortened resource locator 300 to the user 770, perhaps as an HTTP response to his initial request for a shorter version of the URL 200.

The user 770 then may share the shortened resource locator 300 (e.g., http://XYZ123/user123.com) with other Internet users via a social website such as TWITTER. When Internet users click on the shortened resource locator 300, the second network resource 330 will render in their browser. Traffic generated by the online advertisements 310 may be monitored by an account management module 750, which may be configured to track the traffic generated by online advertisements 320, collect remuneration (Step 410) for online advertisement 320 click-throughs, and share such financial remuneration with the user 770 (Step 420), perhaps via known electronic funds transfer systems and methods.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising the steps of:
receiving from a user, by at least one server computer communicatively coupled to a network, a request to shorten a uniform resource locator resolving to a first network resource stored on a second server computer, said request comprising said uniform resource locator;
retrieving at least a portion of said first network resource from said second server computer using said uniform resource locator resolving to said first network resource;
parsing, by at least one of said at least one server computer, said uniform resource locator or said first network resource into at least one keyword;
transmitting, by at least one of said at least one server computer, at least one of said at least one keyword to an online advertisement provider;
receiving, by at least one of said at least one server computer, at least one online advertisement from said online advertisement provider, wherein said at least one online advertisement is relevant to said at least one keyword;
generating, by at least one of said at least one server computer, a second network resource comprising said at least a portion of said first network resource retrieved from said second server computer and at least one of said at least one online advertisement;

storing, by at least one of said at least one server computer, said second network resource on a storage device accessible to said at least one server computer;

generating, by at least one of said at least one server computer, a shortened resource locator resolving to said second network resource stored on said storage device accessible to said at least one server computer, said shortened resource locator not resolving to said first network resource; and transmitting, by at least one of said at least one server computer, said shortened resource locator to said user.

2. The method of claim 1, wherein said first network resource comprises a webpage.

3. The method of claim 1, wherein said online advertisement provider comprises a contextual advertising service.

4. The method of claim 1, wherein said second network resource comprises a webpage.

5. The method of claim 4, wherein said webpage comprises a frame prepended over said first network resource.

6. The method of claim 5, wherein said frame comprises at least one of said online advertisement.

7. The method of claim 2, wherein said at least one online advertisement comprises a text-highlighted advertisement on said webpage.

8. The method of claim 1, wherein said shortened resource locator comprises a user identifier identifying said user.

9. The method of claim 1, further comprising the step of receiving a remuneration from said online advertisement provider.

10. The method of claim 9, further comprising the step of sharing said remuneration with said user.

11. The method of claim 10, wherein said remuneration comprises money to be paid on a cost per-click, cost-per-impression, cost-per-acquisition, flat fee, or recurring fee basis.

* * * * *